BEST AVAILABLE COPY

May 3, 1927. E. V. CROWELL Re. 16,607

OIL OR GAS WELL

Original Filed Aug. 13, 1921 4 Sheets-Sheet 1

INVENTOR
E. V. Crowell
J. M. R. Billy
ATTORNEY

May 3, 1927, Re. 16,607

E. V. CROWELL

OIL OR GAS WELL

Original Filed Aug. 13, 1921 4 Sheets-Sheet 2

INVENTOR
E. V. Crowell
Jack A. Schley
ATTORNEY

May 3, 1927. E. V. CROWELL Re. 16,607
OIL OR GAS WELL
Original Filed Aug. 13. 1921 4 Sheets-Sheet 3
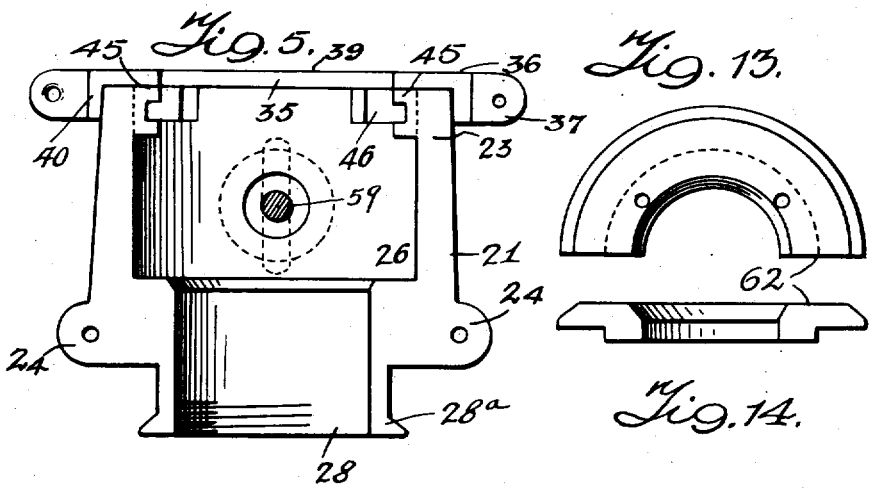
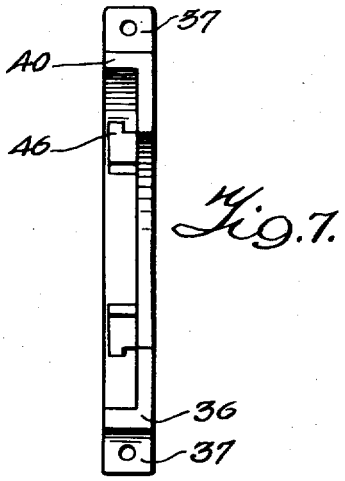
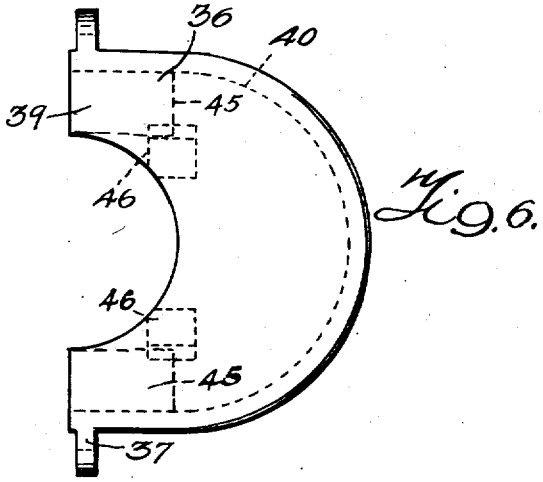
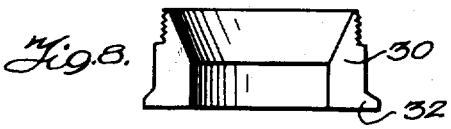
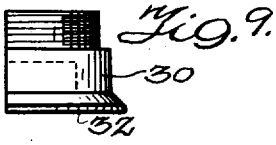
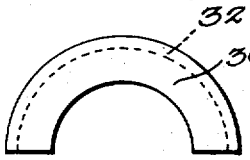
INVENTOR
E. V. Crowell
Jacob Schley
ATTORNEY May 3, 1927. Re. 16,607

E. V. CROWELL

OIL OR GAS WELL

Original Filed Aug. 13, 1921 4 Sheets-Sheet 4

INVENTOR
E. V. Crowell
Jack D. Ashley
ATTORNEY

Reissued May 3, 1927. Re. 16,607

UNITED STATES PATENT OFFICE.

ERD V. CROWELL, OF LOS ANGELES, CALIFORNIA, ASSIGNOR OF ONE-HALF TO THE GUIBERSON CORPORATION, OF DALLAS, TEXAS, A CORPORATION OF DELAWARE.

OIL OR GAS WELL.

Original No. 1,472,555, dated October 30, 1923, Serial No. 492,056, filed August 13, 1921. Application for reissue filed June 28, 1926. Serial No. 119,262.

The present invention relates in general to oil or gas wells and more particularly to a tubing oil saver for use in conjunction with the ordinary equipment of flowing oil or gas wells.

The ordinary equipment of flowing oil or gas wells usually consists, in the main, of a casing, a casing head having a top and a tubing and packer.

The fundamental purpose of oil well casings is that of protection, that is to say to keep the water and caving formations from falling into the open hole and thereby obstructing the flow of oil or gas. It also serves as a conduit through which the expelled oil or gas from a flowing well may freely escape to the surface. It is often desirable and even necessary to insert a pipe of smaller diameter than the casing and therefore the tubing equipped with the packer is introduced into the well for the purpose of building up the pressure by restricting the outlet. The tubing and packer prolong and more evenly control the flow energy of the well and more easily direct the flow of the oil or gas. The process of inserting a string of tubing into an oil or gas well and building up the pressure as above stated is commonly referred to as "tubing" the well.

The process of "tubing" a flowing oil or gas well, as now practiced, is often attended with a great waste of oil or gas at the surface as well as a greatly increased danger from fire and greatly increased hazard to operators since the heavy gases from a flowing well hover about the top of the well. The escape of the oil and gases is usually violent and is due to the fact that in order to introduce the packer through the casing head the casing head top must be entirely removed thus leaving an opening through which the oil and gas are free to escape.

One of the principal objects of the invention is to provide a tubing oil saver which is associated with the casing head and which permits the introduction of the tubing packer without necessitating the dismantling of the oil saver and without permitting the escape of oil or gas whereby the danger of fire is minimized and the hazard to the operators is reduced.

Another object of the invention is to provide a tubing oil saver which may be readily assembled on or removed from the casing head of a flowing oil or gas well without disturbing the flow of oil or gas through the tubing.

Another important object of the invention is to provide a yieldable seal for the casing head of a flowing oil or gas well and flexible means of controlling and regulating the seal, so devised that any cylindrical tool or tubing may be passed through the casing head while the annular space around the tool or tubing is sealed against the escape of oil or gas, thus diverting the flow of oil and gas out laterally through the casing head ports.

Another important and exclusive advantage of the invention is that it not only provides a yieldable means of sealing the annular space around the tubing, but that it may be momentarily opened up to the full radial area of the casing mouth,—thus permitting to pass a tool of larger diameter than the tubing through the casing head and then again sealing the annular space around the tubing.

Another object is to provide a tubing oil saver which may be readily removed after the tubing and packer have been introduced and set in position in the well.

Another object is to provide a tubing oil saver of this character which is of simple and durable construction, reliable and ready in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 5 is a detail view in elevation of one of the sections of the bowl of the tubing oil saver;

Figure 6 is a detail view in plan of one of the sections of the top thereof;

Figure 7 is a similar view in elevation;

Figure 1:
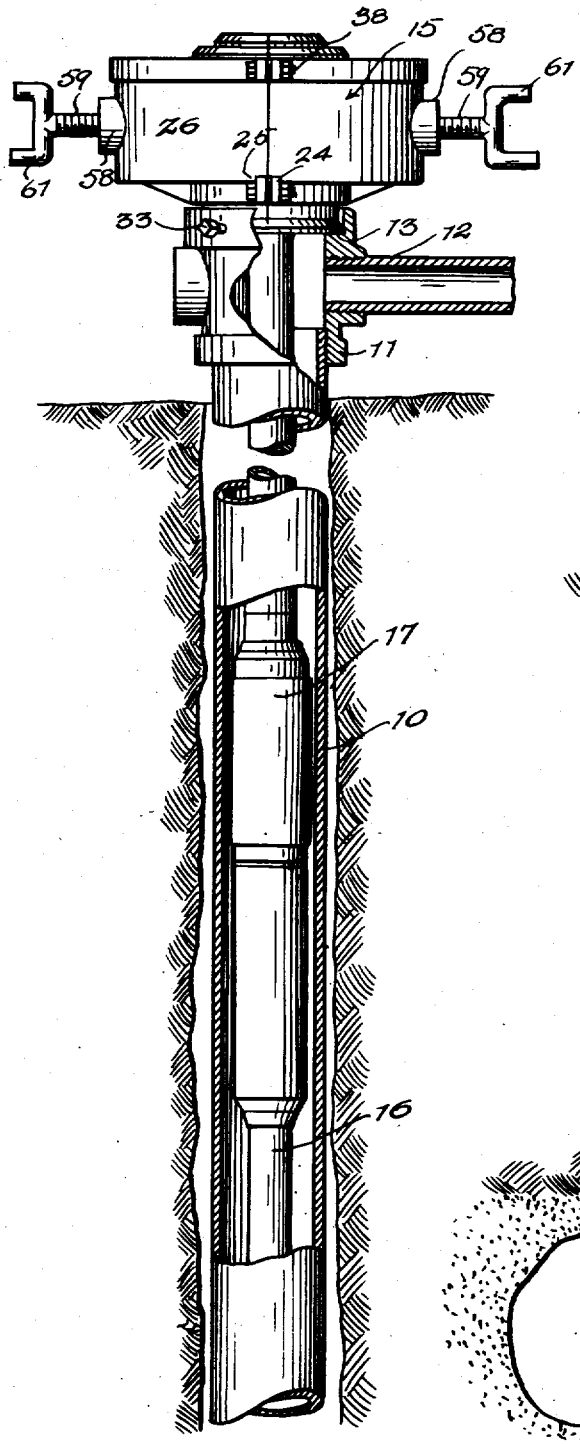
Figures 1 and 2 are fragmentary views in elevation of the invention embodied in a well, parts being broken away and shown in section for the sake of illustration.
Figure 2:
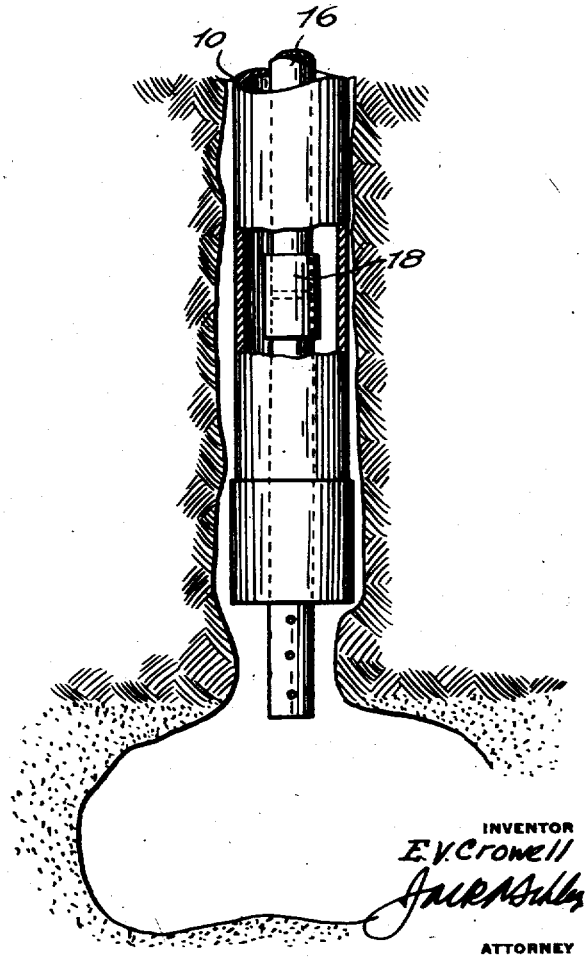
Figure 3:
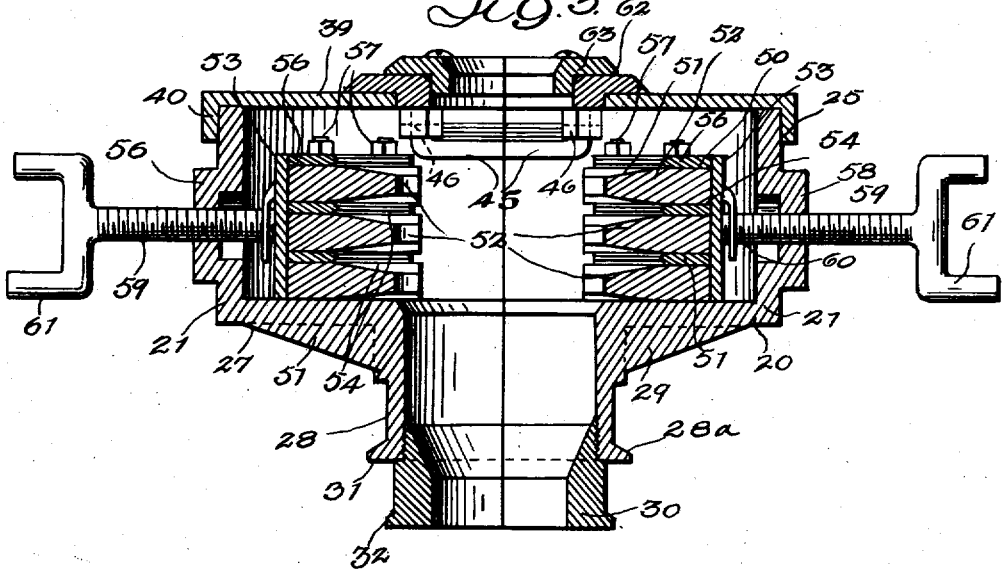
Figure 3 is a view in transverse vertical section of the tubing oil saver.
Figure 4:
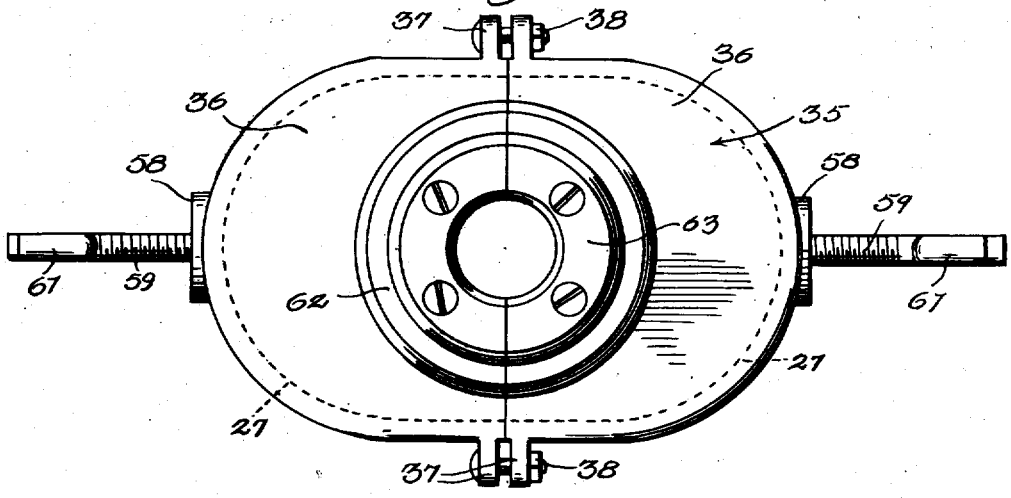
Figure 4 is a plan view thereof.
Figure 11:
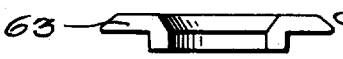
Figure 12:
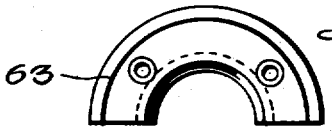

Figures 8, 9, and 10 are detail views of one of the sections of the false bottom;

Figures 11 and 12 are detail views in elevation and in plan respectively, of one of the tubing rings;

Figures 13 and 14 are similar views of the other tubing ring; and

Figure 15:
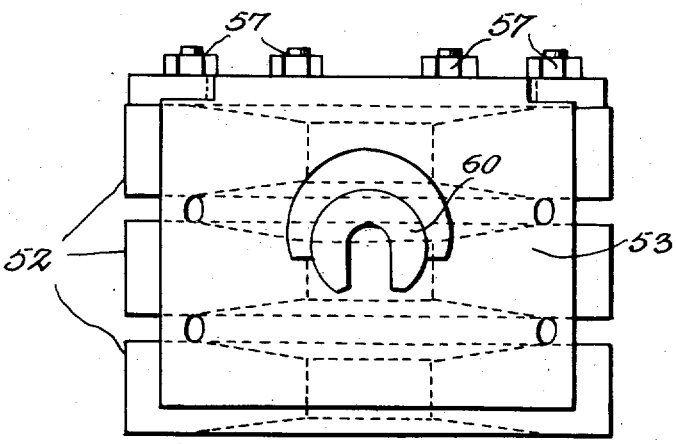
Figure 16:
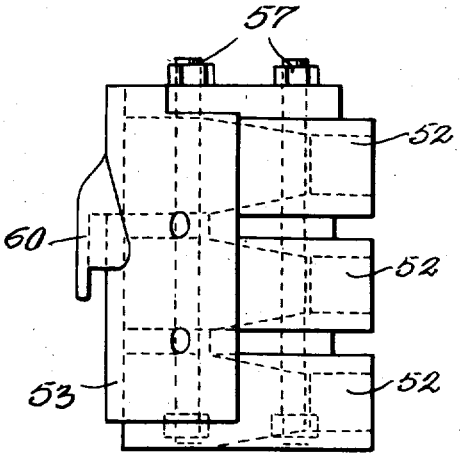

Figure 15 is a detail view in elevation of one of the cages of the packing rubber;

Figure 16 is a similar view in side elevation of the cage; and

Figure 17:
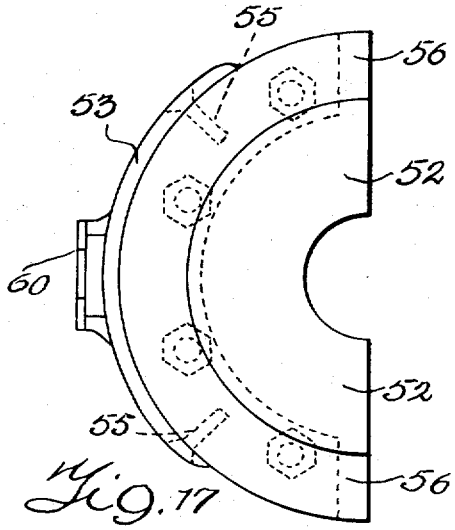

Figure 17 is a plan view thereof.

Referring to the drawings wherein for the sake of illustration is shown the preferred embodiment of the invention, the numeral 10 designates the well casing, upon which the casing head 11 includes lateral outlets 12 and an annular seat 13 at its upper end which ordinarily receives the casing head top but which in the present instance receives the tubing oil saver, designated generally at 15. Tubing 16 extends down into the well casing through the casing head and the tubing oil saver and includes a packer 17 of any standard type. Below the packer 17 the tubing 16 preferably has incorporated therein a "Neath's" tubing disk, designated at 18, and which comprises a disk of thin cast iron sheet which seals the tubing until it is broken by dropping a weight through the tubing when the packer is set and when all is ready to direct the oil or gas through the tubing.

The tubing oil saver 15 comprises a bowl consisting of two similar and symmetrical sections 21 (see Figure 5). Each section 21 has a meeting face 23, milled, ground or otherwise machined or formed to a smooth fit so that when the sections are united to form the bowl and secured together the bowl will be gas-tight. Each section includes assembly lugs 24 which are alined in the assembly and coact with bolts and nuts 25 to retain the sections of the bowl in assembly. The bowl in assembly includes a shell or body portion 26, a base portion 27 and a depending extension 28, the extension 28 being braced and strengthened by webs 29 integral with the base and the extension.

The extension 28 is provided with a bevel or inclined-shoulder 28a at its lower end which is to be received on the shoulder 13 of the casing head and secured thereto by means of coacting set screws 33. In order to provide means for attaching the device to other sizes of casing heads a false bottom 30 is provided and has threaded connection as at 31, with the extension 28 and is provided at its lower end with an inclined or beveled annular shoulder 32 which is received on the seat 13 of the casing head and which coacts with set screws 33 carried by the casing head to maintain the tubing oil saver in position on the casing head. The false bottom 30 also consists of two similar and symmetrical sections, one of such sections being shown in detail in Figures 8, 9 and 10. It may be detached without detracting from the completeness of the device and is to be used according to the size of casing head on which the device is to be installed.

A top, designated generally at 35 is provided for the bowl and includes similar and symmetrical sections 36 (see Figures 6 and 7) adapted to be releasably connected with each other by means of assembly lugs 37 and bolts and nuts 38. In assembly, the top includes a body portion 39 and a depending marginal flange 40 which extends down around the shell or body portion of the bowl. The shell or body portion 26 of the bowl is provided with slideways 45 which slidably receive guide lugs 46 carried by the top. Each section 21 of the bowl is provided with a pair of these slideways and each section 36 of the top is provided with a pair of co-acting lugs whereby these elements do not in any way detract from the demountable character of the oil saver although insuring a complete organization of the top and bowl in the assembly.

A packing rubber, designated generally at 50, is provided and is arranged in the bowl 20. The packing rubber consists of two sections, designated at 51, each section consisting of a series or plurality of semi-annular rubber disks or rings 52, each series of rubber disks or rings being carried by the sections 53 of a cage. Each cage section 53 carries two vertically spaced stationary rings 54 constituting spacing rings for semi-annular rubber disks or rings 52, the rings 54 being secured to these cage sections by screws 55. A loose semi-annular ring 56 is arranged on the top rubber disk or ring and the rings 54 and 56 are secured together by means of vertically extending bolts and nuts 57 the bolts of which extend through suitable openings provided therefor in the spacing rings and in the rubber disks or rings. The packing rubber sections are movable or adjustable into packing engagement with the tubing or out of packing engagement with and away from the tubing. When the sections are moved away from the tubing they permit of convenient introduction of the packer.

Attention is called to the particular design of the semi-annular rubber disks or rings 52. Each disk or ring is moulded thinner at the center than at the outer edge,—thus when the cage sections 53 are adjusted into packing engagement with the tubing, the rubber disks or rings will more readily adjust themselves as the tubing and tubing collars are lowered through the rubber disks or rings.

Attention is also called to the feature of being able to inter-change the rubbers, or install rubbers with various size holes in the center, all according to the size of tubing to be run through them.

Operating mechanism is provided for adjusting or moving the sections of the packing rubber to and away from the tubing so as to permit the introduction of the tubing packer and for this purpose the bowl sections 21 are provided with threaded bearings 58 in which operating screws 59 are journaled, the operating screws 59 having swivelled connections 60 with the cage sections at their inner ends and operating handles 61 on their exterior ends.

Superposed tubing rings 62 and 63 are carried by the top and extend around the central opening thereof. These rings also consist of similar and symmetrical sections shown in detail in Figures 11 to 14.

The tubing rings 62 and 63, shown in detail in Figures 11 to 14 provide a base or rest for the tubing elevators while lowering a string of tubing into the well, they are made in symmetrical sections so that they may be dismantled the same way as the other major parts of the device. They are made of two sizes, thus providing an elevator rest for the prevailing sizes of tubing.

As shown, they are telescoped into each other, and in turn, telescoped into the top 39, thus held in a central position.

In practice, the packing rubbers are adjusted or moved into operative packing engagement with the tubing by turning the operating screws 59 so as to cause the cages and the packing rubber sections to move across the floor of the base 20 of the bowl and into engagement with the tubing. When it is desired to introduce the tubing packer, the handles 61 of the operating screws are grasped and the operating screws are turned to retract the packing rubber sections and move them away from the tubing thus affording ample space for the introduction of the packer. After the packer has passed through the casing head the packing rubbers may be again moved quickly into engagement with the tubing and in this manner waste of oil and gas and increase of danger and hazard are prevented. When the tubing and packer have been set into position in the well the tubing oil saver may be readily removed by taking out the bolts from the assembly lugs and demounting the sectional bowl, cage and packer rubbers.

What I claim, is:

1. In a device of the character described, a bowl comprising sections, means for releasably securing the sections of the bowl together in assembly, a top for said bowl comprising sections, means for releasably securing the sections of the top together in assembly, slideways carried by the sections of the bowl, lugs carried by the sections of the top and operatively engaged in said slideways, a packing rubber in said bowl including an adjustable section operating in each of the sections of said bowl, a cage for the packing rubber having a section for each of the sections of said packing rubber, and operating mechanism for the packing rubber sections including an operating screw journaled in each bowl section, a swiveled connection between each operating screw and the adjacent cage section of its bowl section, and a handle for each operating screw.

2. In a device of the character described, a bowl comprising sections, means for releasably securing the sections of the bowl together in assembly, a top for said bowl comprising sections, means for releasably securing the sections of the top together in assembly, a packing rubber in said bowl including an adjustable section operating in each of the sections of said bowl, a cage for the packing rubber having a section for each of the sections of said packing rubber, and operating mechanism for the packing rubber sections including an operating screw journaled in each bowl section, and a swiveled connection between each operating screw and the adjacent cage section of its bowl section.

3. In a device of the character described, a bowl comprising sections, means for releasably securing the sections of the bowl together in assembly, a top for said bowl comprising sections, means for releasably securing the sections of the top together in assembly, slideways carried by the sections of the bowl, lugs carried by the sections of the top and operatively engaged in said slideways, a packing rubber in said bowl including an adjustable section operating in each of the sections of said bowl, and a cage for the packing rubber having a section for each of the sections of said packing rubber.

4. In a device of the character described, a bowl, a packing rubber in said bowl and including adjustable sections, each of said sections comprising a series of semi-annular packing disks, a cage for said packing rubber including a section for each section of the packing rubber, each cage section having rigidly secured thereto semi-annular spacing rings for the semi-annular disks of the packing rubber sections, a loose semi-circular spacing ring superposed on the uppermost semi-annular packing disk and bolts and nuts connecting said disks and rings, and operating mechanism for said adjustable packing rubber sections including operating screws, swiveled connections between the operating screws and the cage sections, and handles for the operating screws.

5. In a device of the character described, a bowl, a packing rubber in said bowl and including adjustable sections, each of said sections comprising a series of semi-annular packing disks, a cage for said packing rubber including a section for each section of the packing rubber, each cage section having rigidly secured thereto semi-annular spacing rings for the semi-annular disks of the packing rubber sections, a loose semi-annular spacing ring superposed on the uppermost semi-annular packing disk and bolts and nuts connecting said disks and rings, and operating mechanism for said adjustable packing rubber sections including operating screws, and swiveled connections between the operating screws and the cage sections.

6. In a device of the character described, a bowl including sections, means for releasably securing the sections of the bowl together in assembly, a packing rubber including an adjustable section operatively arranged in each bowl section, each adjustable section including a series of semi-annular disks, a cage for said packing rubber including a section for each section of the packing rubber, each cage having semi-annular spacing rings for the semi-annular disks of its packing rubber section, and means for securing the rings and disks in position in the cage section, an operating mechanism for each packing rubber section including an operating screw journaled in each bowl section and a swiveled connection between each operating screw and the cage section of its bowl section.

7. In a device of the character described, a bowl, a packing rubber arranged in said bowl and comprising adjustable sections, each of said sections including a vertical series of spaced contact edge portions each capable of being bent on an arc tangential to the surface of the tubing to permit passage of a projection thereon, a packing rubber cage including a section for each section of the packing rubber, and operating mechanism for each of said packing rubber sections and associated with said cage sections.

8. A tubing oil saver for use with flowing oil or gas wells having a casing, a casing head and tubing, and arranged on said casing head and including a bowl, a false bottom carried by said bowl, means coacting with the false bottom for securing the bowl on the casing head, a packing rubber arranged in said bowl and comprising sections movable into packing engagement with said tubing and out of packing engagement with and away from said tubing, and operating mechanism for said rubber sections.

9. In a device of the character described, a bowl, a top for said bowl consisting of sections separable therefrom and provided with an opening, and a tubing ring mounted in said opening of the top.

10. In a device of the character described, a casing head having a seat thereon, a bowl having an extension provided with a beveled or inclined shoulder on its lower end, said extension being internally threaded, a false bottom having threads cooperable with the internal threads of said extension and having a beveled or inclined shoulder on its lower end and set screws carried by the casing head and selectively engageable with the beveled shoulder of the extension or with the beveled shoulder of the false bottom.

11. In a device of the character described, a bowl comprising sections, means for releasably securing the sections of the bowl together in assembly, a top for said bowl comprising sections slidably fitted to the sections of said bowl, means for releasably securing the sections of the top together in assembly and a packing rubber in said bowl including an adjustable section operating in each of the sections of said bowl.

12. In a device of the character described, a bowl, a packing rubber in said bowl and including adjustable sections, each of said sections comprising a series of semi-annular packing disks, a cage for said packing rubber including a section for each section of the packing rubber, each cage section having rigidly secured thereto semi-annular spacing rings for the semi-annular disks of the packing rubber sections, and a loose semi-circular spacing ring superposed on the uppermost semi-annular packing disk and bolts and nuts connecting said disks and rings.

13. A tubing oil saver for use with flowing oil or gas wells having a casing, a casing head and tubing arranged on said casing head and including an elongated bowl and a packing rubber, composed of opposite sections having spaced contact edge portions capable of being bent in an arc tangential to the tubing to permit the passage of a projection thereon through the packing, forming sections engageable with the tubing for sealing the annular space around said tubing, said sections being movable to the ends of said elongated bowl to open up the full radial area of the casing so as to permit a packer or the like to pass through said bowl.

14. A tubing oil saver for use with flowing oil or gas wells having a casing, a casing head and tubing comprising sections coupled to each other and including a bowl arranged on said casing head, a packing rubber arranged in the bowl and engaged with the tubing, said packing rubber comprising spaced free contact edges all of which are capable of being bent in an arc tangential to the tubing to permit of the passage of the couplings of the tubing through the packing rubber without necessitating adjustment of the same.

15. As a sub-combination, a tube packing member for an oil saver having a plurality of spaced substantially parallel free contact lips disposed within the inner circumference thereof and each of which is capable of being bent in an arc to permit the passage of a projection upon the tube through the member and maintain a plurality of points of contact with said tube.

16. As a sub-combination in an oil saver, a vertically split packing member having a plurality of spaced free contact lips disposed normally in horizontal planes within the bore of said member, each lip of which is capable of being bent in a vertical arc above and below its normal plane to permit the passage of a projection upon the tube traveling through the member and to maintain a plurality of points of contact with said tube.

17. As a sub-combination in an oil saver, a vertically split packing member having a plurality of spaced free contact lips disposed within the bore of said member, each lip of which is capable of being bent in a vertical arc above and below its normal plane to permit the passage of a projection upon a tube traveling through the member and to maintain a plurality of points of contact with said tube.

ERD V. CROWELL.